United States Patent
Blum

(10) Patent No.: US 8,284,452 B2
(45) Date of Patent: Oct. 9, 2012

(54) METHOD FOR SCREENING COLOR SEPARATIONS OF A LENTICULAR IMAGE AND METHOD FOR PRODUCING A LENTICULAR IMAGE ON A PRINTING MATERIAL

(75) Inventor: Dietrich Blum, Kiel (DE)

(73) Assignee: Heidelberger Druckmaschinen AG, Heidelberg (DE)

(*) Notice: Subject to any disclaimer, the term of this patent is extended or adjusted under 35 U.S.C. 154(b) by 813 days.

(21) Appl. No.: 12/468,082

(22) Filed: May 19, 2009

(65) Prior Publication Data

US 2009/0284798 A1 Nov. 19, 2009

(30) Foreign Application Priority Data

May 19, 2008 (DE) .................... 10 2008 024 238

(51) Int. Cl.
*G06K 15/00* (2006.01)
*G03B 21/60* (2006.01)

(52) U.S. Cl. ...... 358/3.06; 358/1.9; 358/3.05; 358/3.07; 358/3.09; 358/3.11; 358/3.12; 358/3.14; 358/3.16; 358/3.2; 358/3.21; 358/3.22; 358/3.23; 358/3.3; 358/533; 358/534; 358/535; 358/536; 382/167; 382/243; 382/252; 382/270; 382/285; 359/19; 359/455; 359/456; 359/457; 359/463; 359/619; 359/621; 359/622; 359/623; 359/624

(58) Field of Classification Search .................. None
See application file for complete search history.

(56) References Cited

U.S. PATENT DOCUMENTS

| 3,462,226 | A | 8/1969 | Huffaker |
| 5,519,794 | A | 5/1996 | Sandor et al. |
| 5,617,178 | A | 4/1997 | Goggins |
| 6,091,482 | A * | 7/2000 | Carter et al. .................... 355/79 |
| 7,136,185 | B2 * | 11/2006 | Goggins ........................ 358/1.2 |
| 2005/0271292 | A1 * | 12/2005 | Hekkers ........................ 382/243 |
| 2009/0034006 | A1 * | 2/2009 | Blondal et al. ............... 358/3.13 |

FOREIGN PATENT DOCUMENTS

| DE | 1597547 A1 | 8/1970 |
| DE | 10022225 A1 | 11/2001 |
| EP | 0772797 B1 | 3/2003 |
| EP | 1689162 A2 | 8/2006 |
| JP | 2000105559 A | 4/2000 |
| WO | 2006041812 A2 | 4/2006 |

* cited by examiner

*Primary Examiner* — Steven Kau
(74) *Attorney, Agent, or Firm* — Laurence A. Greenberg; Werner H. Stemer; Ralph E. Locher

(57) ABSTRACT

A method is disclosed for screening color separations of a lenticular image with a lenticular frequency of the lenticular lenses needed for viewing the lenticular image. An amplitude-modulated halftone image is calculated for each of the color separations at a screen angle and at a screen frequency, the tangent of the screen angle being a rational number. For a specific color separation, a screen angle relating to the direction perpendicular to the image strips of the lenticular image is defined, a pair of whole numbers whose ratio is equal to the tangent of the screen angle is determined, and the screen frequency of the color separation is calculated as the product of the lenticular frequency and the square root of the sum of the squares of the two whole numbers. For the purpose of producing lenticular images on a printing material, the color separations calculated in accordance with this method are in each case exposed onto a printing form, and the exposed printing forms are printed off in a press in the overprint on a printing material, so that a multicolor lenticular image is produced on the printing material.

13 Claims, 4 Drawing Sheets

METHOD FOR SCREENING COLOR SEPARATIONS OF A LENTICULAR IMAGE AND METHOD FOR PRODUCING A LENTICULAR IMAGE ON A PRINTING MATERIAL

CROSS-REFERENCE TO RELATED APPLICATION

This application claims the priority, under 35 U.S.C. §119, of German application DE 10 2008 024 238.1, filed May 19, 2008; the prior application is herewith incorporated by reference in its entirety.

BACKGROUND OF THE INVENTION

Field of the Invention

The invention relates to a method for screening color separations of a lenticular image with a lenticular frequency of the lenticular lenses needed for viewing the lenticular image, in which an amplitude-modulated halftone image is calculated for each of the color separations at a screen angle and at a screen frequency, the tangent of the screen angle being a rational number. Furthermore, the invention relates to a method for producing a lenticular image on a printing material.

To an increasing extent in high quality pack printing it is desired to achieve special effects for the human eye, in order to increase the attractiveness of the printed pack and therefore of the product contained therein. For this purpose, the production of lenticular images, in particular, is widespread. These consist of an ordered sequence, matched to a lenticular frequency, of a plurality of images broken down into strips, which are viewed through a group of lens strips of corresponding lenticular frequency (in lenses per unit length) which are oriented in the direction of the image strips. Depending on the viewing angle, the individual strips of the ordered sequence projected by the lenses in this viewing direction form an assembled overall image. Given an appropriately selected order of the strips of a plurality of images, different overall images can be visible under different viewing angles. In this way, for example, an illusion of movement can be generated if a series of individual images of successive movement steps can be perceived successively as a function of the viewing angle.

In most of the widespread printing methods, in particular for offset printing, in order to implement differences in brightness it is necessary to produce an image screened into colored dots, which brings about the desired impression of brightness for the viewer. Familiar methods use colored dots arranged in a regular grid, whose area sizes are varied (amplitude-modulated grids). In the case of multicolor printing, in particular for four-color printing, as is known there is the risk that, in the overprinting of screens of the plurality of color separations, optically visible and therefore disturbing artifacts will be produced if the screen images of the individual color separations interfere with one another (e.g. moiré effect).

In practice, it has transpired that the fact that the lenticular image has an excellent angular direction because of the direction of the arranged image strips and a lenticular frequency (in lenses per unit length)—a spatial frequency—constitutes an additional challenge in the production of screened lenticular images.

As compared with conventional images, a lenticular image has an additional periodicity in one direction, which can interfere with that of the grid of color separations, so that undesired visible artifacts occur. In particular, the lenticular frequency or a small multiple of the lenticular frequency and a grid frequency (in halftone dots per unit length, widely designated lines per inch) are of the same order of magnitude. Hitherto, a remedy has been achieved only by screens whose parameters have been determined on the basis of empirical trials. Until now, there has existed no method in which a screen having suitable parameters was determined systematically.

SUMMARY OF THE INVENTION

It is accordingly an object of the invention to provide a method for screening color separations of a lenticular image and a method for producing a lenticular image on a printing material that overcome the above-mentioned disadvantages of the prior art devices and methods of this general type, which permits screening of a lenticular image with a minimum moiré effect.

With the foregoing and other objects in view there is provided, in accordance with the invention, a method for screening color separations of a lenticular image with a lenticular frequency of lenticular lenses needed for viewing the lenticular image. The method includes the steps of: calculating an amplitude-modulated halftone image for each of the color separations at a screen angle and at a screen frequency, a tangent of the screen angle being a rational number; defining the screen angle relating to a direction perpendicular to image strips of the lenticular image for a specific color separation; determining a pair of whole numbers (n, m) whose ratio (m/n) is equal to the tangent of the screen angle; and calculating the screen frequency of the specific color separation as a product of the lenticular frequency and a square root of a sum of squares of the whole numbers.

In the method according to the invention for screening color separations of a lenticular image with a lenticular frequency of the lenticular lenses needed for the viewing of the lenticular image, an amplitude-modulated halftone image is calculated for each of the color separations at a screen angle and at a screen frequency, the tangent of the screen angle being a rational number. For a specific color separation, a screen angle relating to the direction perpendicular to the image strips of the lenticular image is defined. A pair of whole numbers (n, m) whose ratio (m/n) is equal to the tangent of the screen angle is determined. The screen frequency of the color separation is calculated as the product of the lenticular frequency and the square root of the sum of the squares of the two whole numbers.

According to the invention, in pursuing the object a screening method is created in which an amplitude-modulated screen which is expedient for the printing of a lenticular image, in particular the screen angle and the screen width thereof for the individual halftone images of the color separations, is determined. The screen is oriented in the direction of the lenticular image. In an advantageous consequence, in particular in the overprinting of a plurality of color separations, no interaction occurs between the screen having the lenticular frequency and the image content of the lenticular image arranged in ordered strips.

The successful action of the method according to the invention is based on the principle that all the screens used for the individual color separations have the same period as the lenticular lenses in the direction perpendicular to the lenses. To those skilled in the art in the technical field described in this illustration, it is clear that the lenticular frequency is in practice not constant over the lenticular image, so that a corresponding tolerance is permissible in practice, which means that even approximate equality of the periods is sufficient without disturbing moiré effects being able to occur. Following appropriate studies, it has transpired that the still acceptable tolerance for this approximate equality is ±2 image lines, preferably ±1 image line, so that the fact that familiar raster image processors cannot normally produce angle and width combinations exactly but only with a certain tolerance is unimportant in practice.

Since, for the viewer of the lenticular image, because of the lenticular lenses, it is always only an extract from the grid enlarged in one dimension that is visible, rosette patterns, such as are known from the overprinting of color separations in familiar grids, disappear. Viewed through the lenticular lenses, the viewer always sees the corresponding extract from the grid in each lens. In this way, a moiré effect between the lens and the grid is avoided. In order to avoid a disturbing effect in the lens direction, the approach known from RT screens is followed in order to minimize moiré periods.

The frequencies are spatial frequencies. The grid produced in the method according to the invention is in particular an orthogonal grid. The steps of the method according to the invention can be applied to each of the color separations. The halftone dots can be circular, elliptical, square or linear.

In the method according to the invention, the screen angles are preferably different from each other for two color separations in each case. In other words, for different color separations, halftone images are produced whose grids are rotated relative to one another or are located at different angles with respect to the direction of the lenticular image. According to the invention, the screens at different screen angles can have screen widths different from one another.

Furthermore, the screen angle for a specific color separation can be chosen from a group of screen angles which are optimized for the minimization of moiré effects in screening operations. The screen angles can, for example, be angles of the screen which are widely used, whose different screen angles have a logical tangent and whose screen angles are optimized to avoiding moiré effects (RT screens).

In a first exemplary embodiment of the method according to the invention, the screen angle is 0 degrees or 45 degrees or approximately 18.435 degrees (tangent equal to ⅓) or approximately 161.565 degrees (tangent equal to −⅓).

In a second preferred embodiment of the method according to the invention, the screen angle is approximately 33.69 degrees (tangent equal to ⅔) or approximately 146.31 degrees (tangent equal to −⅔) or approximately 18.435 degrees (tangent equal to ⅓) or approximately 161.565 degrees (tangent equal to −⅓).

In the method according to the invention for screening color separations of a lenticular image, in particular four halftone images of four color separations can be calculated for the four-color printing in cyan, magenta, yellow and black. For a multicolor print having a larger or smaller number of colors, a corresponding number of halftone images can be calculated from color separations. In particular, one or more of the color separations can be provided for a special color which is not intended to be produced from the primary colors by mixing.

In the case of four color separations for the overprinting in four-color printing (cyan, magenta, yellow, black), in the two aforementioned embodiments in each case a screen angle is provided for a halftone image of a color separation; in general the allocation of the colors is arbitrary and can be chosen in accordance with the motif of the lenticular image or another criterion for the purpose of optimizing the result.

In the method according to the invention, provision can additionally be made that, for a screen angle in which a number of pairs of whole numbers (n, m) exist whose ratio (m/n) is equal to the tangent of the screen angle, use is made of that calculated screen frequency—after it has been chosen in particular from those calculated—which, at a standard screen frequency provided for the image setting, has a minimum absolute value of the difference between the screen frequency and the standard screen frequency. The standard screen frequency can in particular be that of a printing form exposer, printing plate exposer, in particular an offset printing plate exposer (for example for imaging thermal printing plates or UV printing plates). Devices of this type operate with a standard screen frequency or are configured or optimized for a standard screen frequency at which imaging is carried out as standard. In specific embodiments, the standard screen frequency can lie between 200 and 300 LPI (lines per inch). In other words, for the case in which a number of possible screen frequencies satisfy the conditions according to the invention, use is made of that screen frequency which comes closest to a standard screen frequency, in particular the printing form exposer frequency.

In a specific group of embodiments of the method according to the invention, use is made of screen angles whose tangent is a rational number which can be represented as a ratio of whole numbers whose magnitudes are smaller than 12.

The lenticular frequency can lie between 5 and 150 LPI (lines per inch), preferably between 15 and 120 LPI, in particular between 70 and 80 LPI.

In a further development of the method according to the invention for screening color separations of a lenticular image, the calculated screen frequency can be multiplied by the inverse of a natural number greater than 1. In other words, for the screen, not only a lens period but a multiple of the lens period by a natural number can be used as a basis. The natural number can in particular be 2 or 3. At this point, it should be mentioned that, for the angles 0 degrees and 45 degrees, it is preferred to use only one lens period as a basis, in order to avoid effects dependent on the viewing angle.

Also associated with the invention is a computer program product, in particular a screen parameter calculation program or a raster image processor (RIP). The screen parameter calculation program can in particular generate output data in the Portable Data Format (PDF) or in PostScript (PS), with which a raster image processor can be supplied. The raster image processor can in particular process input data in the Portable Data Format (PDF) or in PostScript (PS). The computer program product according to the invention can be loaded directly into the internal memory of a digital computer and/or stored on a computer-suitable medium, for example a DVD. It contains one or more software code sections with which all the steps of a method having the features or feature combinations according to this illustration are executed when the product runs on a computer.

As a consequence of the use of the method according to the invention having the features and feature combinations described in this illustration, a method according to the invention for the production, in particular the production by printing, of a lenticular image on a printing material is created. According to the invention, to produce a lenticular image, the color separations calculated in accordance with a method having the features or feature combinations according to this illustration are in each case exposed on to a printing form, in particular a printing plate, and the exposed printing forms, in particular printing plate, are printed off in a press in the overprint on the printing material, so that a multicolor lenticular image is produced on the printing material.

The lenticular image can be part of a larger printing subject. The press can in particular be a pack printing press or a label printing press. In particular, use can be made of the printing processes including offset printing, gravure printing, flexographic printing, letterpress printing or screen printing, in each case individually or in combination.

In an additional step in the method according to the invention for producing a lenticular image, a lens film having a sequence of lenses in the lenticular frequency can be applied to the printed lenticular image in the same orientation as the lenticular image.

The printing material can in particular be paper, paperboard, board, organic polymer film or aluminum foil.

Other features which are considered as characteristic for the invention are set forth in the appended claims.

Although the invention is illustrated and described herein as embodied in a method for screening color separations of a lenticular image and a method for producing a lenticular image on a printing material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
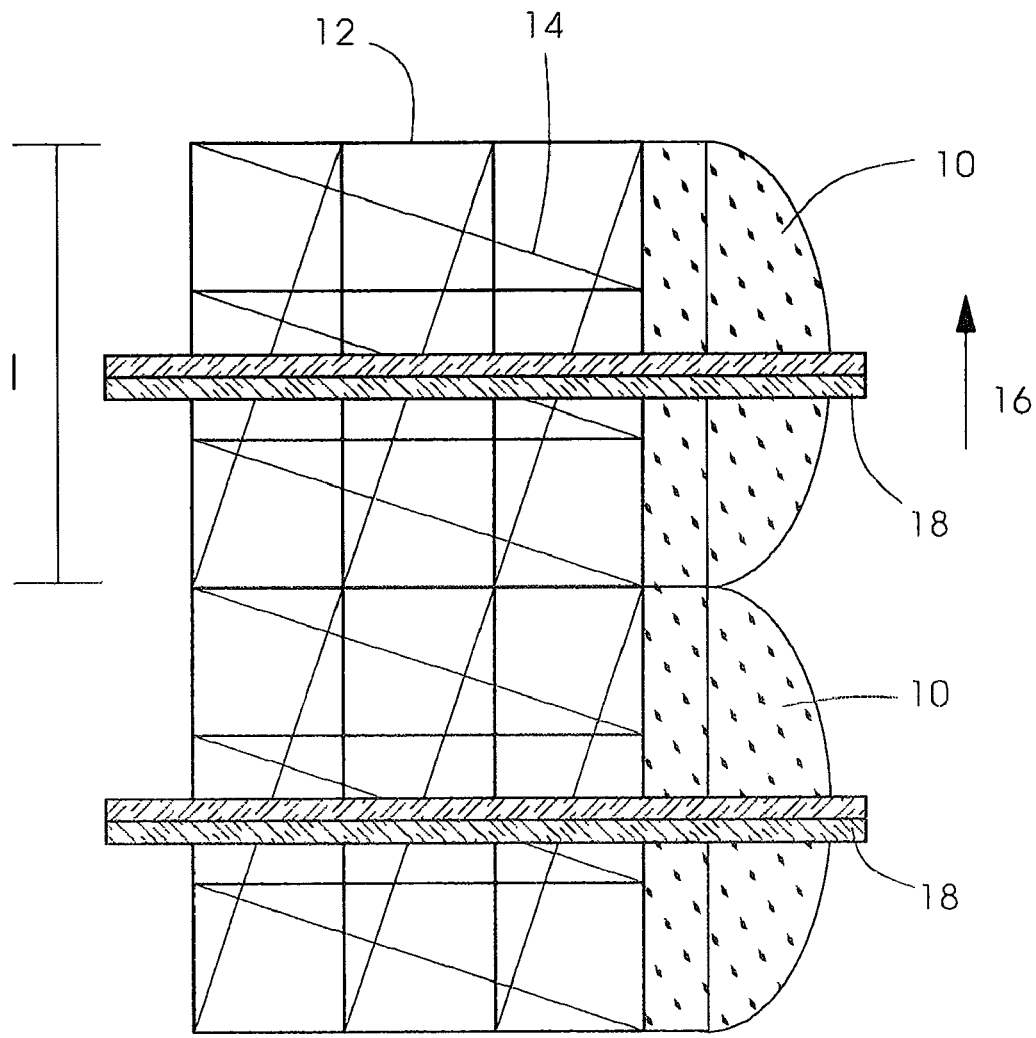
FIG. 1 is a schematic illustration of two lenticular lenses with an example of a screen lying underneath.

Referring now to the figures of the drawing in detail and first, particularly, to FIG. 1 thereof, there is shown is a schematic illustration of two lenticular lenses 10 having a lens width l with two examples of screens 12, 14 lying underneath from a lenticular image. The first screen 12 is oriented in a direction 16 of the lens periodicity, the second screen has an angle of about 18.4349 degrees with respect to this direction 16 (tangent of the angle equal to ⅓). This illustration reveals in particular the periodicity of the two screens 12, 14 in the direction perpendicular to the direction 16 of the lens periodicity. Because of the imaging of the lenticular image through the lenticular lenses 10, only extracts 18 from the image are visible to the viewer.

Figure 2:
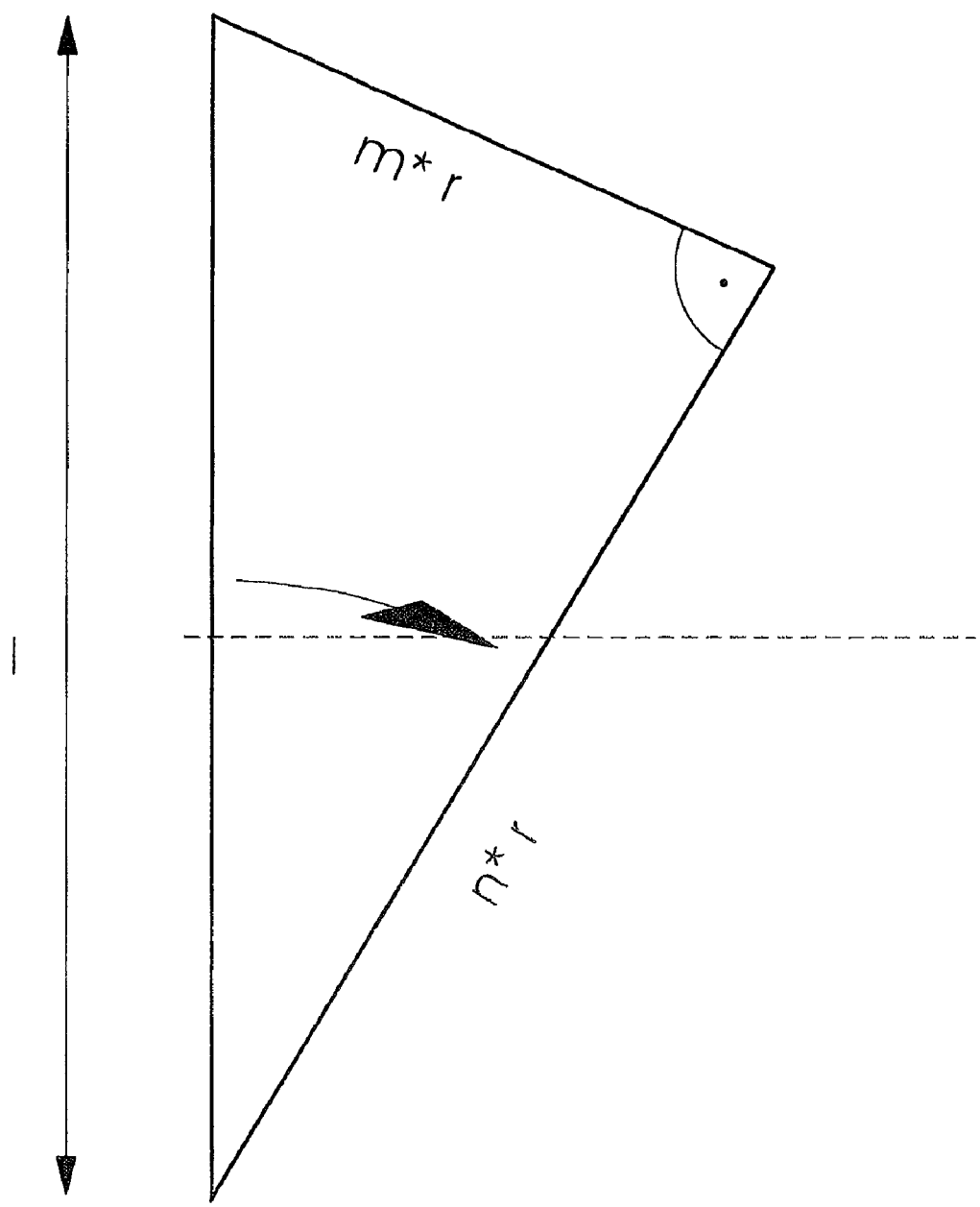
FIG. 2 is an illustration showing a right-angled triangle for a calculation according to the invention of a screen frequency for a defined screen angle.

FIG. 2 shows a right-angled triangle to illustrate the calculation according to the invention of the screen frequency for a defined screen angle. The hypotenuse of the triangle is formed by the lens width l. The short sides of the triangle are the n-fold and, respectively, the m-fold of the screen width r, n and m being whole numbers whose signs determine the angles of the short sides in the mathematically positive or negative direction. According to the invention, pairs of numerical values (n, m) are determined for the desired screen angles of the individual color separations, the ratio m/n being the tangent of the screen angle. The screen width r for a screen angle is then equal to the lens width divided by the square root of the sum of the squares of the numbers n and m. In a corresponding way, the screen frequency is equal to the lenticular frequency multiplied by the square root of the sum of the squares of the numbers n and m.

Figure 3:
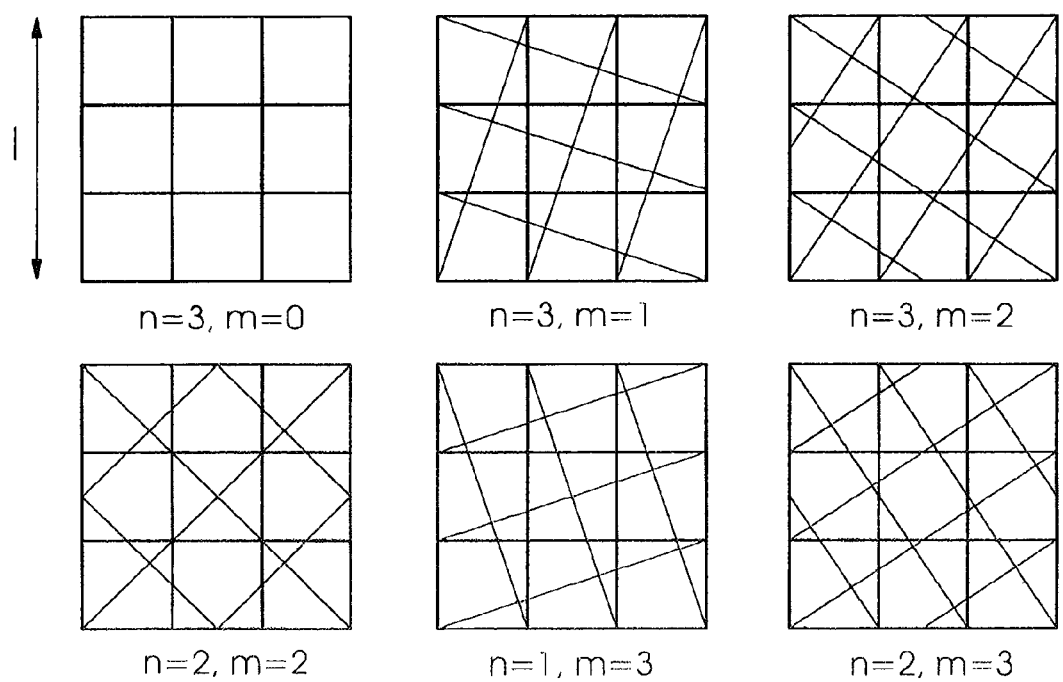
FIG. 3 is an illustration showing a first group of example screens having small whole numbers.

FIG. 3 shows a first group of examples of screens having small whole numbers. Even by using the small numbers 0, 1, 2 and 3 as values for the pairs of numbers (n, m), it is possible to find a series of expedient screen angles for a screen according to the invention for a lenticular image which avoid disturbing moiré effects when the method steps according to the invention are applied to the overprint and in relation to the lens periodicity. In FIG. 3, the cells repeating in the screen are shown.

Figure 4:
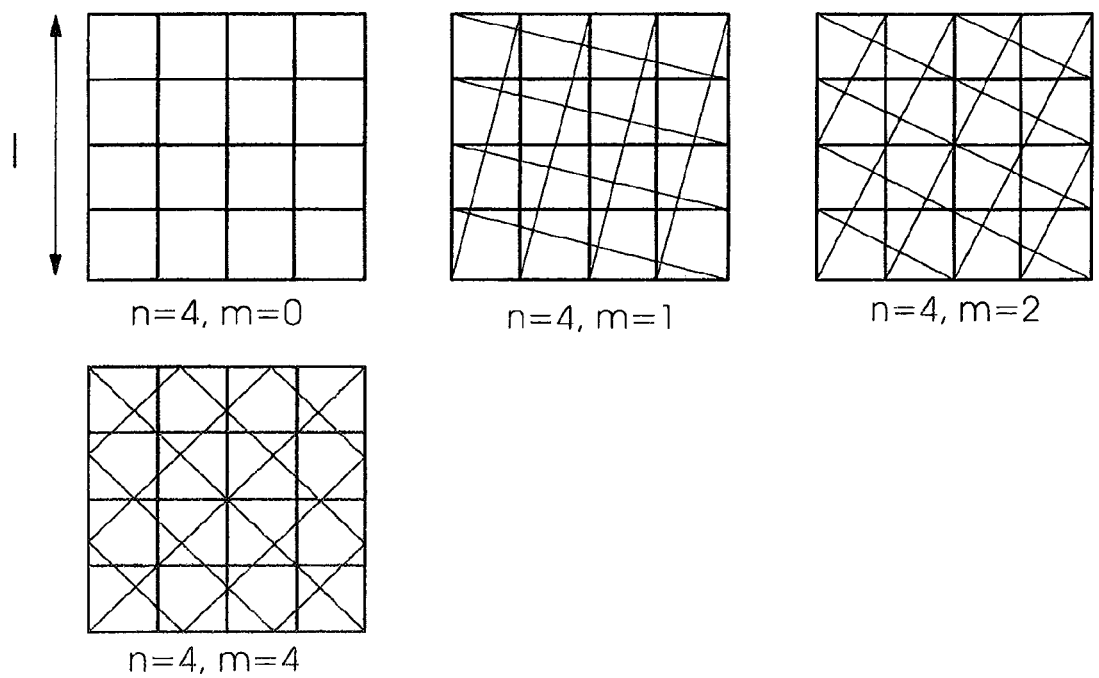
FIG. 4 is an illustration showing a second group of example screens having small whole numbers.

FIG. 4 shows a second group of examples of screens having small whole numbers. As an alternative to the values for the pairs of numbers (n, m) used for FIG. 3, in this FIG. 4 screen cells are shown by way of example in which n=4 and m is a small whole number.

In conclusion, two practical examples of a lenticular film having a lenticular frequency of 74.706 lpi are to be specified.

In example 1, the following screen angles are used for the individual colors:

Cyan screen angle=18.4349 degrees, magenta screen angle=161.565 degrees, yellow screen angle=0.0 degrees and black screen angle=146.31 degrees. The pairs of numbers are then: (3, 1) for cyan, (3, −1) for magenta, (3, 0) for yellow and (2, 2) for black. According to the invention, the screen finenesses/screen frequencies are calculated as: cyan screen frequency=236.241 lpi, magenta screen frequency=236.241 lpi, yellow screen frequency=224.118 lpi and black screen frequency=211.3 lpi.

In example 2, the following screen angles are used for the individual colors:

Cyan screen angle=18.4349 degrees, magenta screen angle=161.565 degrees, yellow screen angle=33.6901 degrees and black screen angle=146.31 degrees. The pairs of numbers are then: (3, 1) for cyan, (3, −1) for magenta, (3, 2) for yellow and (3, −2) for black. According to the invention, the screen finenesses/screen frequencies are calculated as: cyan screen frequency=236.241 lpi, magenta screen frequency=236.241 lpi, yellow screen frequency=269.356 lpi and black screen frequency=269.356 lpi.

The invention claimed is:

1. A method for screening color separations of a lenticular image with a lenticular frequency of lenticular lenses needed for viewing the lenticular image, which comprises the steps of:
    calculating an amplitude-modulated halftone image for each of the color separations at a screen angle and at a screen frequency, a tangent of the screen angle being a rational number;
    defining the screen angle relating to a direction perpendicular to image strips of the lenticular image for a specific color separation;
    determining a pair of whole numbers (n, m) whose ratio (m/n) is equal to the tangent of the screen angle; and
    calculating the screen frequency of the specific color separation as a product of the lenticular frequency and a square root of a sum of squares of the whole numbers.

2. The method for screening color separations of the lenticular image according to claim 1, wherein the screen angles are different from each other for two of the color separations in each case.

3. The method for screening color separations of the lenticular image according to claim 1, which further comprises choosing the screen angle for the specific color separation from a group of screen angles which are optimized for a minimization of moiré effects in screening operations.

4. The method for screening color separations of the lenticular image according to claim 1, which further comprises selecting the screen angle from the group consisting of 0 degrees, 45 degrees, approximately 18.435 degrees having a tangent equal to ⅓, and approximately 161.565 degrees having a tangent equal to −⅓.

5. The method for screening color separations of the lenticular image according to claim 1, which further comprises selecting the screen angle from the group consisting of approximately 33.69 degrees having a tangent equal to ⅔, approximately 146.31 degrees having a tangent equal to −⅔, approximately 18.435 degrees having a tangent equal to ⅓ and approximately 161.565 degrees having a tangent equal to −⅓.

6. The method for screening color separations of the lenticular image according to claim 1, which further comprises calculating four halftone images of four color separations for four-color printing in cyan, magenta, yellow and black.

7. The method for screening color separations of the lenticular image according to claim 1, wherein for the screen angle in which a number of pairs of the whole numbers (n, m) exist whose ratio (m/n) is equal to the tangent of the screen angle, use is made of that calculated screen frequency which, at a standard screen frequency provided for image setting, has a minimum absolute value of a difference between the screen frequency and a standard screen frequency.

8. The method for screening color separations of the lenticular image according to claim 1, which further comprises using screen angles whose tangent is a rational number which can be represented as a ratio of whole numbers whose magnitudes are smaller than 12.

9. The method for screening color separations of the lenticular image according to claim 1, wherein the lenticular frequency lies between 5 and 150 lines per inch.

10. The method for screening color separations of the lenticular image according to claim 1, which further comprises multiplying a calculated screen frequency by an inverse of a natural number greater than 1.

11. A non-transitory computer-readable medium having computer-executable instructions to be executed on a computer and performing a method for screening color separations of a lenticular image with a lenticular frequency of lenticular lenses needed for viewing the lenticular image, which method comprises the steps of:
   calculating an amplitude-modulated halftone image for each of the color separations at a screen angle and at a screen frequency, a tangent of the screen angle being a rational number;
   defining the screen angle relating to a direction perpendicular to image strips of the lenticular image for a specific color separation;
   determining a pair of whole numbers (n, m) whose ratio (m/n) is equal to the tangent of the screen angle; and
   calculating a screen frequency of a color separation as a product of the lenticular frequency and a square root of a sum of squares of the whole numbers.

12. A method for producing a lenticular image on a printing material, which comprises the steps of:
   calculating screening color separations of the lenticular image with a lenticular frequency of lenticular lenses needed for viewing the lenticular image, which includes the steps of:
      calculating an amplitude-modulated halftone image for each of the color separations at a screen angle and at a screen frequency, a tangent of the screen angle being a rational number;
      defining the screen angle relating to a direction perpendicular to image strips of the lenticular image for a specific color separation;
      determining a pair of whole numbers (n, m) whose ratio (m/n) is equal to the tangent of the screen angle; and
      calculating a screen frequency of a color separation as a product of the lenticular frequency and a square root of a sum of squares of the whole numbers;
   exposing the color separations calculated in each case onto a printing form; and
   printing off exposed printing forms in a press via an overprint on a printing material, so that a multicolor lenticular image is produced on the printing material.

13. The method for producing a lenticular image according to claim 12, which further comprises applying a lens film having a sequence of lenses in the lenticular frequency to a printed lenticular image in a same orientation as the lenticular image.

* * * * *